(12) United States Patent
Bauer et al.

(10) Patent No.: US 12,223,718 B2
(45) Date of Patent: *Feb. 11, 2025

(54) SYSTEMS AND METHODS FOR THE ANALYSIS OF MOVING OBJECTS

(71) Applicants: Trevor Bauer, San Diego, CA (US); Warren Bauer, San Diego, CA (US)

(72) Inventors: Trevor Bauer, San Diego, CA (US); Warren Bauer, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,309

(22) Filed: Sep. 25, 2023

(65) Prior Publication Data

US 2024/0169728 A1    May 23, 2024

Related U.S. Application Data

(63) Continuation of application No. 17/856,247, filed on Jul. 1, 2022, now Pat. No. 11,769,326, which is a continuation of application No. 17/024,170, filed on Sep. 17, 2020, now Pat. No. 11,410,424.

(60) Provisional application No. 62/902,015, filed on Sep. 18, 2019.

(51) Int. Cl.
G06V 20/40 (2022.01)
G06V 40/20 (2022.01)
G06V 10/75 (2022.01)

(52) U.S. Cl.
CPC .............. *G06V 20/42* (2022.01); *G06V 20/46* (2022.01); *G06V 40/23* (2022.01); *G06V 10/751* (2022.01)

(58) Field of Classification Search
CPC ........... G06K 9/00724; G06K 9/00744; G06K 9/6202; G06K 9/00342; G06V 20/42; G06V 10/751; G06V 20/46; G06V 40/23
See application file for complete search history.

(56) References Cited

U.S. PATENT DOCUMENTS

| | | | |
|---|---|---|---|
| 7,457,439 B1 * | 11/2008 | Madsen | G06T 7/251 348/154 |
| 8,142,267 B2 | 3/2012 | Adams | |
| 8,774,467 B2 | 7/2014 | Ryan | |
| 8,876,638 B2 | 11/2014 | Paul et al. | |
| 9,868,044 B2 | 1/2018 | Johnson et al. | |
| 10,109,061 B2 | 10/2018 | Bose et al. | |
| 2008/0291272 A1 * | 11/2008 | Krahnstoever | G06T 7/246 348/E5.025 |
| 2010/0303303 A1 * | 12/2010 | Shen | G06V 40/20 382/107 |
| 2011/0305369 A1 * | 12/2011 | Bentley | A61B 5/1128 340/572.1 |

(Continued)

FOREIGN PATENT DOCUMENTS

| | | |
|---|---|---|
| WO | 2001041884 | 6/2001 |
| WO | 2014110398 | 7/2014 |

*Primary Examiner* — Dhaval V Patel
(74) *Attorney, Agent, or Firm* — Garson & Gutierrez, PC

(57) ABSTRACT

Methods and apparatus for the analysis of moving objects. In one embodiment, a pitch tracking system is disclosed that includes one or more cameras that have been positioned in a desired location and a computing system containing executable software that is configured to receive imaging data from the one or more cameras that captured the desired location and analyze seam placement and/or finger placement as a function of time for the received imaging data. Computer readable media and methodologies are also disclosed herein.

20 Claims, 15 Drawing Sheets

(56) References Cited

U.S. PATENT DOCUMENTS

| | | |
|---|---|---|
| 2014/0191896 A1 | 7/2014 | Johnson et al. |
| 2015/0238814 A1 | 8/2015 | Paul et al. |
| 2015/0363648 A1 | 12/2015 | Li et al. |
| 2016/0205341 A1 | 7/2016 | Hollander et al. |
| 2018/0249135 A1 | 8/2018 | Yeo et al. |
| 2019/0321706 A1* | 10/2019 | Stemle .................... G06T 7/70 |

* cited by examiner

| Distance from Release Point (ft.) | 0 | 10 | 20 | 30 | 40 | 50 | 60 |
|---|---|---|---|---|---|---|---|
| Axis of Spin (x°, y°, z°) | (5°, 27°, 0°) | (5°, 27°, 0°) | (4°, 26°, 1°) | (4°, 26°, 1°) | (3°, 25°, 2°) | (3°, 25°, 2°) | (3°, 25°, 2°) |
| Spin-rate (RPM) | 2,540 | 2,535 | 2,530 | 2,525 | 2,520 | 2,515 | 2,510 |
| Velocity (MPH) | 94 | 94 | 93 | 93 | 93 | 92 | 92 |

FIG. 5

SYSTEMS AND METHODS FOR THE ANALYSIS OF MOVING OBJECTS

PRIORITY

This application is a continuation of, and claims the benefit of priority to, U.S. patent application Ser. No. 17/856,247 filed Jul. 1, 2022 of the same title, which is a continuation of, and claims the benefit of priority to, U.S. patent application Ser. No. 17/024,170 filed Sep. 17, 2020 of the same title, which in turn claims the benefit of priority to U.S. Provisional Patent Application Ser. No. 62/902,015 filed Sep. 18, 2019 of the same title, the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to the field of motion capture data analysis using captured video information. For example, embodiments of the present disclosure relate to the analysis of hand/finger placement with relation to the center of mass of a baseball in order to, inter alia, assist with improved body mechanics when, for example, pitching a baseball.

2. Field of the Disclosure

Data analytics within professional and amateur sports is a growing industry. These analytics provide additional information to, for example, general managers, recruiters, coaches, trainers and players in order to achieve more successful outcomes for the teams and the players themselves. For example, the analysis of the motion of a moving object, such as a pitched baseball has gained increasingly widespread adoption throughout the industry. This analysis utilizes several differing approaches. One approach utilizes image capture to assist with the determination of spin axis as well as spin rate for a pitched baseball. Another approach utilizes signals transmitted from and received by a Doppler radar system to measure the speed and spin rate for a thrown object. Yet another approach utilizes motion sensors, where sensor data obtained from the motion sensors is collected and analyzed to measure the properties of the pitched baseball. Each of these differing approaches provides valuable information that is utilized to provide a competitive advantage to both the players and the teams themselves.

Although these prior techniques are beneficial as evidenced by their widespread adoption throughout the industry, each of these motion tracking techniques focuses on the results of the observed motion once the ball is in flight. It would be desirable if techniques were developed that were able to not only accurately measure the results of the observed motion, but also provide insights into how that observed motion was achieved.

SUMMARY

The present disclosure satisfies the foregoing needs by providing, inter alia, improved methods and apparatus for the analysis of moving objects.

In one aspect, a computer-implemented method for determining finger placement with respect to a pitched baseball is disclosed. In one embodiment, the method includes capturing a scene of the pitched baseball; segmenting an object of interest out of the captured scene using a thresholding operation to generate a segmented scene; analyzing the segmented scene to identify markers associated with the object of interest; and comparing the analyzed scene with a prior captured scene so as to enable a comparison in performance for the pitched baseball.

In one variant, the segmenting of the object of interest includes performing the thresholding operation on a pixel-by-pixel basis to determine a subset of the captured scene for the pitched baseball.

In another variant, the performing of the thresholding operation on the pixel-by-pixel basis includes starting the thresholding operation in an area of the captured scene dependent upon a handedness for a pitcher of the pitched baseball.

In yet another variant, the performing of the thresholding operation on the pixel-by-pixel basis includes determining a location of the object of interest within a first frame of a plurality of frames of the captured scene and utilizing the determined location of the object of interest within the first frame to determine the location of the object of interest within a second frame of the plurality of frames.

In yet another variant, the performing of the thresholding operation on the pixel-by-pixel basis for the second frame of the plurality of frames is only performed on a subset of pixels of the second frame.

In yet another variant, the determining of the location of the object of interest includes determining that a pixel value for a pixel within the first frame is within a predetermined range of pixel values.

In yet another variant, the capturing of the scene of the pitched baseball includes capturing a plurality of frames of the captured scene and the segmenting of the object of interest out of the captured scene further includes repositioning the object of interest within the segmented scene within each of the plurality of frames.

In yet another variant, the analyzing of the segmented scene further includes performing a second thresholding operation on the segmented scene to identify the markers associated with the object of interest.

In yet another variant, the performing of the second thresholding operation includes determining placement of a finger with respect to a geometric center of the pitched baseball.

In yet another variant, the performing of the second thresholding operation further includes determining seam orientation with respect to the geometric center of the pitched baseball.

In another aspect, a non-transitory computer-readable storage apparatus is disclosed. In one embodiment, the non-transitory computer-readable storage apparatus includes instructions, that when executed by a processor apparatus, are configured to: receive a plurality of frames of a captured scene of a pitched baseball; segment an object of interest out of the captured scene via use of a thresholding operation to generate a segmented scene; analyze the segmented scene to identify markers associated with the object of interest; and compare the analyzed scene with a prior captured scene so as to enable a comparison in performance for the pitched baseball.

In one variant, the segmentation of the object of interest includes performance of the thresholding operation on a pixel-by-pixel basis to determine a subset of the captured scene for the pitched baseball.

In another variant, the performance of the thresholding operation on the pixel-by-pixel basis includes commencement of the thresholding operation in an area of the captured scene that is dependent upon a handedness for a pitcher of the pitched baseball.

In yet another variant, the performance of the thresholding operation on the pixel-by-pixel basis includes determination of a location of the object of interest within a first frame of a plurality of frames of the captured scene and utilization of the determined location of the object of interest within the first frame to determine the location of the object of interest within a second frame of the plurality of frames.

In yet another variant, the performance of the thresholding operation on the pixel-by-pixel basis for the second frame of the plurality of frames is only performed on a subset of pixels of the second frame.

In yet another variant, the determination of the location of the object of interest includes determination that a pixel value for a pixel within the first frame is within a predetermined range of pixel values.

In yet another variant, the segmentation of the object of interest out of the captured scene further includes a reposition operation of the object of interest within the segmented scene within each of the plurality of frames.

In yet another variant, the analysis of the segmented scene further comprises performance of a second thresholding operation on the segmented scene to identify the markers associated with the object of interest.

In yet another variant, the performance of the second thresholding operation includes determination of placement of a finger with respect to a geometric center of the pitched baseball.

In yet another variant, the performance of the second thresholding operation further includes determination of seam orientation with respect to the geometric center of the pitched baseball.

In yet another aspect, a pitch tracking system is disclosed. In one embodiment, the pitch tracking system includes one or more cameras that have been positioned in one or more desired locations and a computing system containing executable software that is configured to receive imaging data from the one or more cameras that captured the desired location and analyze seam placement and finger placement as a function of time for the received imaging data.

In yet another aspect, a method of tracking a pitch is disclosed. In one embodiment, the method includes receiving one or more captured images, identifying one or more marker locations within the captured images, overlaying a circle and crosshairs on the captured images, and removing the background image with the exception of the identified marker locations.

In yet another aspect, a method of altering a viewpoint within a virtualized scene is disclosed. In one embodiment, the method includes capturing a scene using one or more cameras, virtualizing the captured scene and altering the viewpoint within the virtualized scene.

In yet another aspect, a method for estimating the velocity of a pitched baseball based on a baseline measurement and one or more subsequent image captures is disclosed.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein:

FIG. 5 is a graphical depiction of various parameters as a function of distance, in accordance with the principles of the present disclosure.

All Figures disclosed herein are © Copyright 2019 Trevor Bauer and Warren Bauer. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of the disclosed system (or methods) for purposes of illustration only. One skilled in the art will readily recognize from the following description that alternative embodiments of the structures and methods illustrated herein may be employed without necessarily departing from the principles described herein.

While primarily discussed in the context of the application of video analysis to a thrown baseball, it would be readily apparent that the principles of the present disclosure described herein has broader utility outside of the game of baseball. For example, the techniques and apparatus described may find utility in other sports including, without limitation, softball, cricket, football, soccer, various track and field events, bowling, and the like. These and other variants would be readily apparent to one of ordinary skill given the contents of the present disclosure.

Exemplary Operating Examples

Figure 1A:
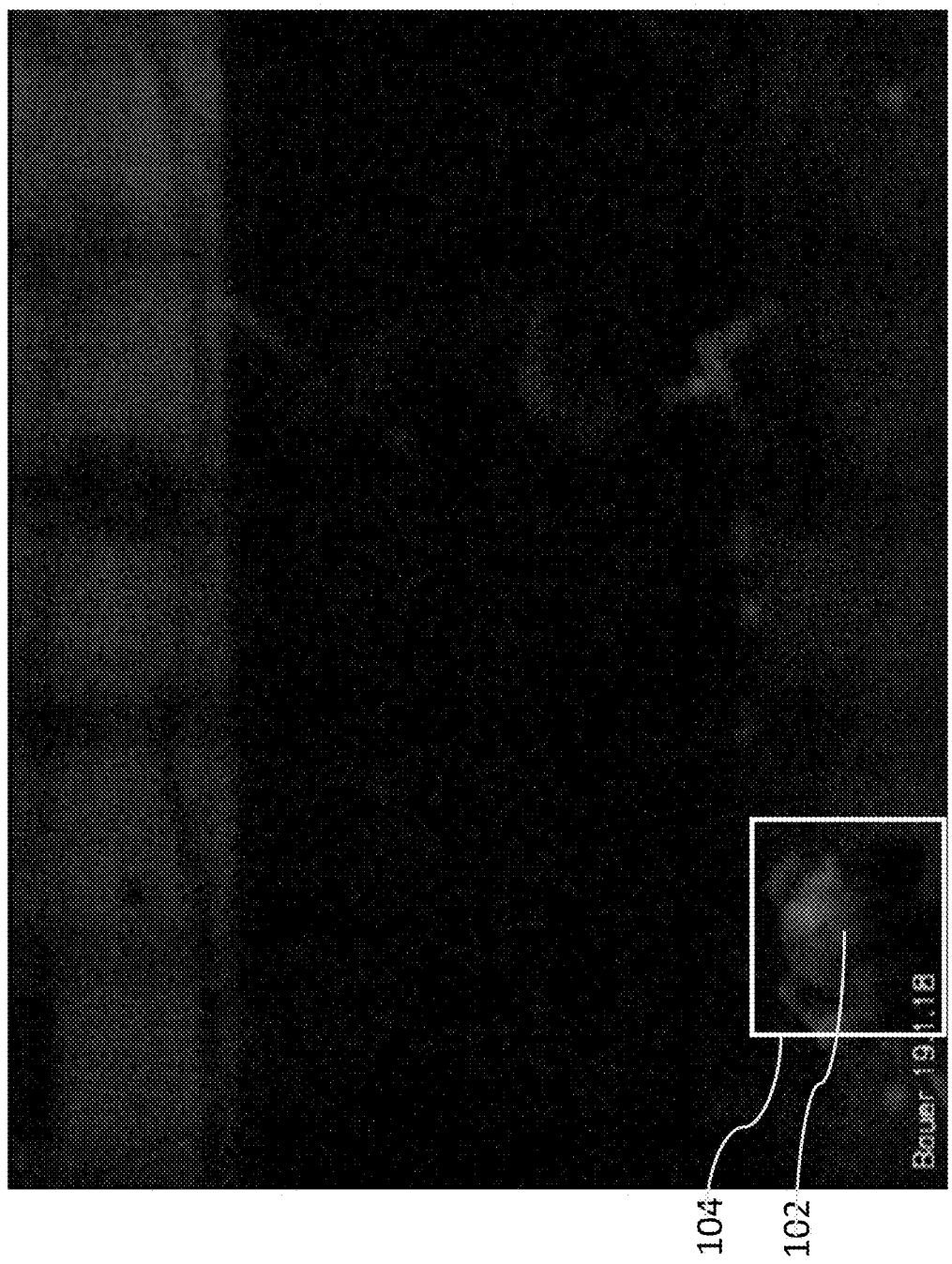
FIGS. 1A-1E are a series of images from an exemplary video capture of a thrown baseball immediately prior to release, in accordance with the principles of the present disclosure.
Figure 1B:
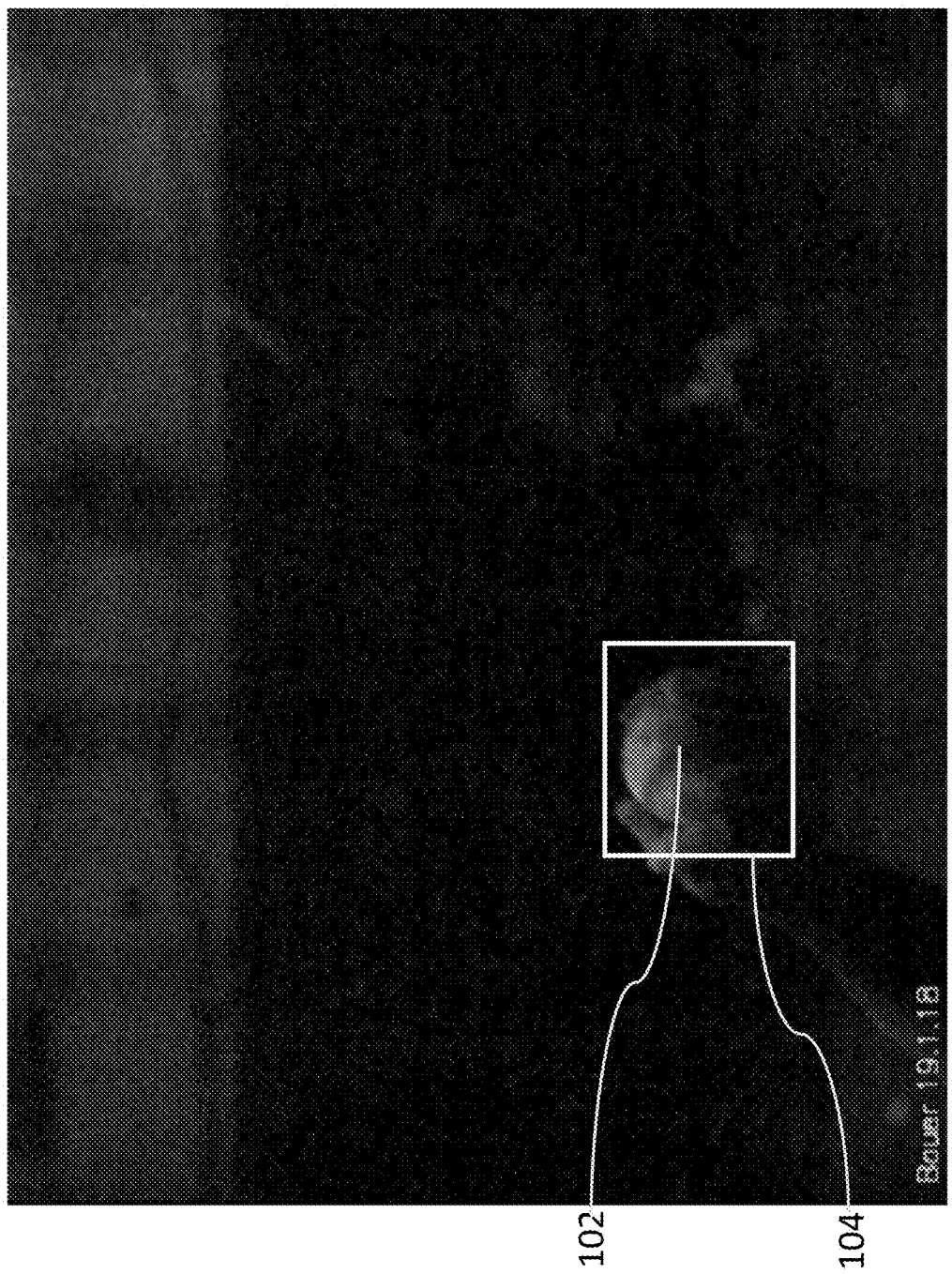
Figure 1C:
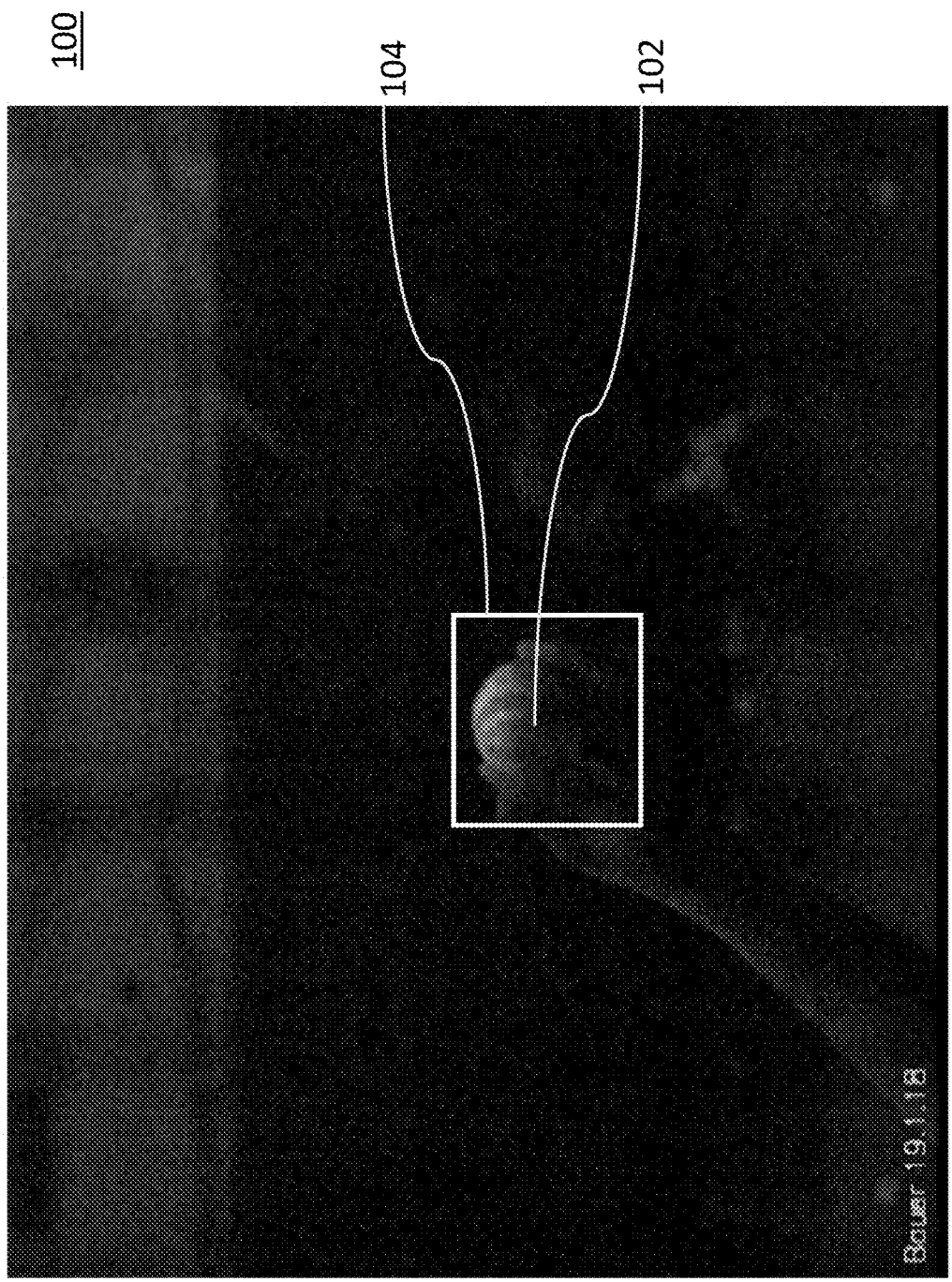
Figure 1D:
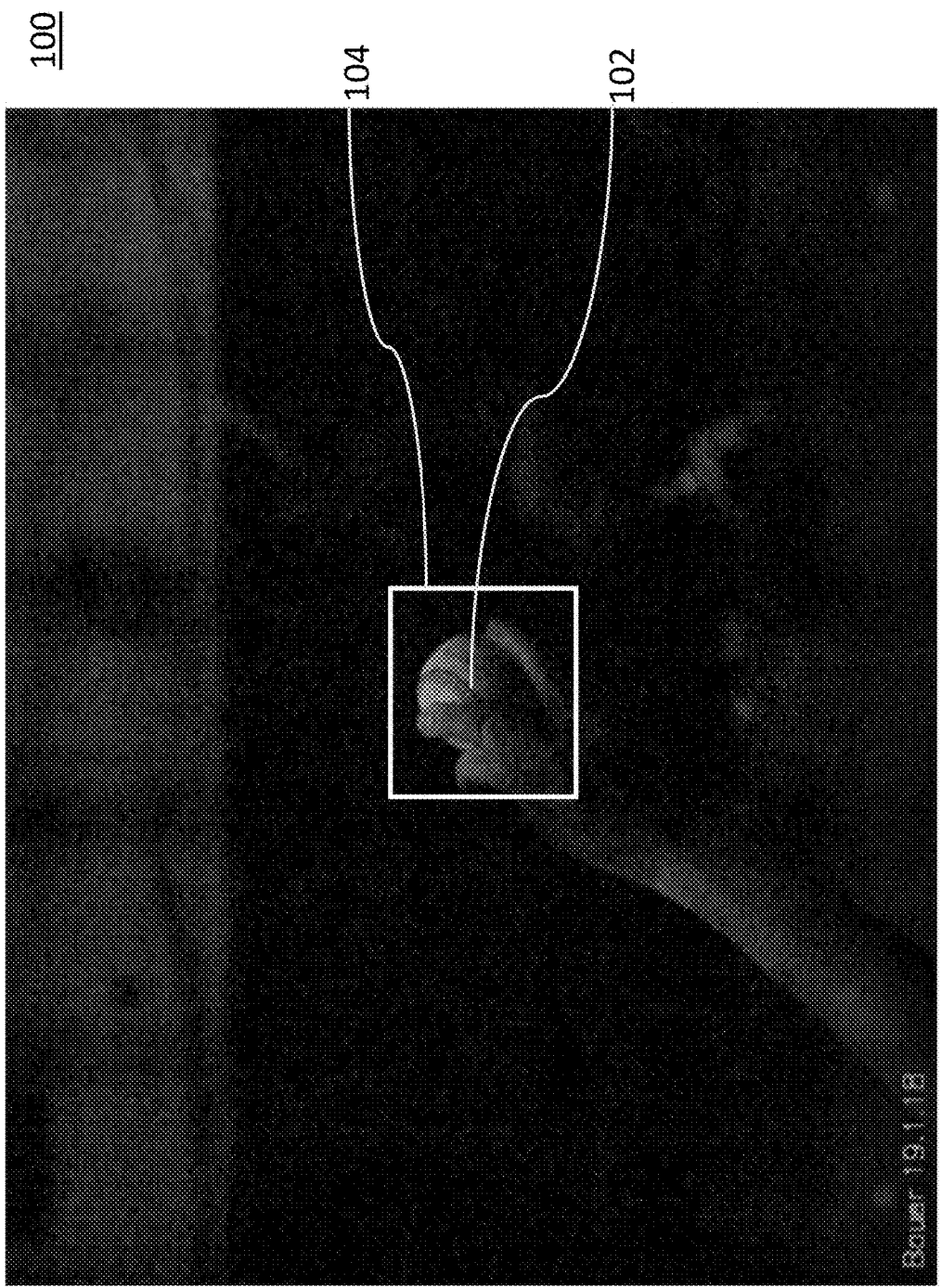
Figure 1E:
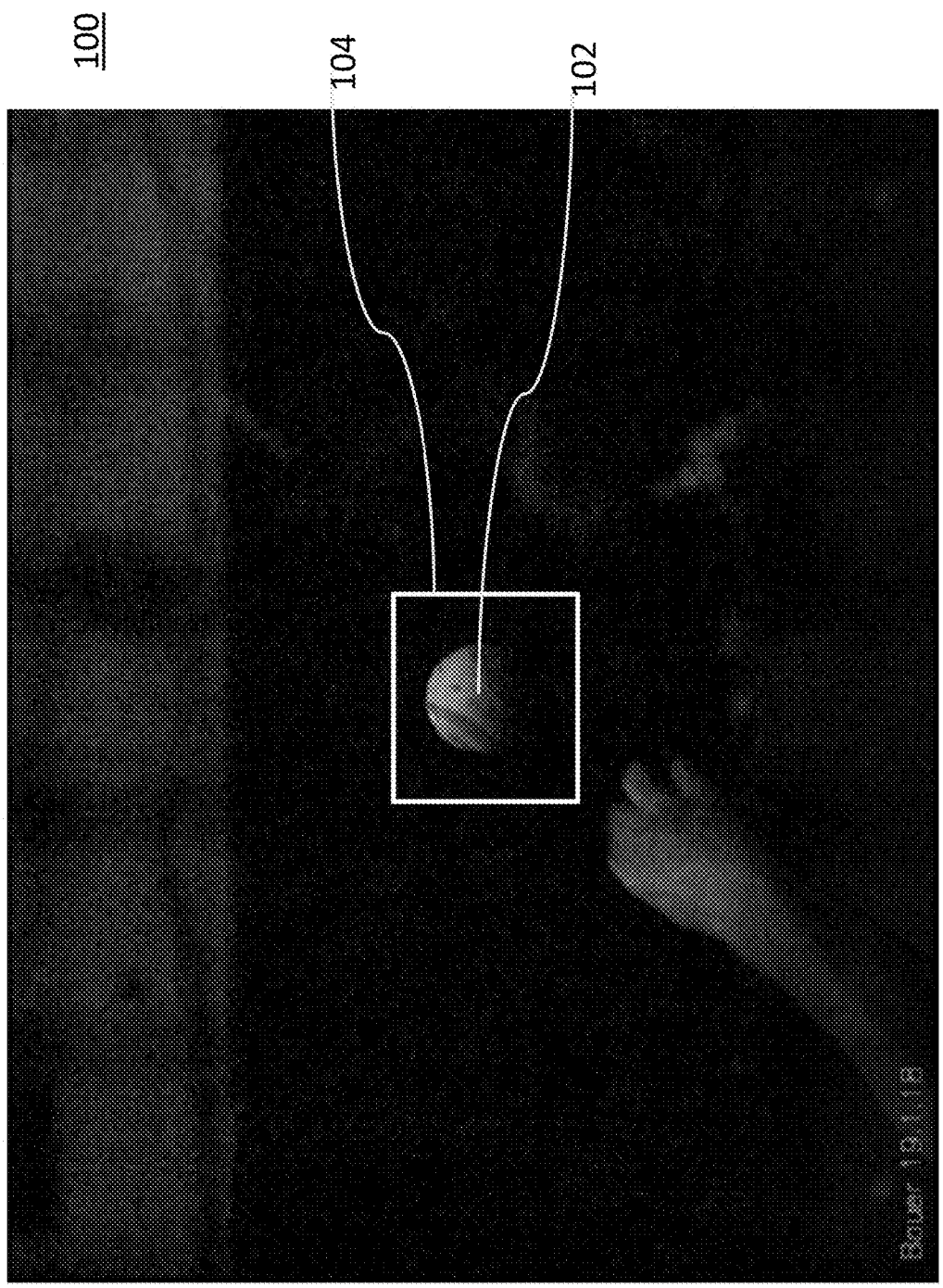

Referring now to FIGS. 1A-1E, one exemplary video analysis example 100 is shown and described in detail. In particular, FIG. 1A shows a right-handed pitcher in his motion at time to, FIG. 1B shows the pitcher in his motion at time $t_1$, FIG. 1C shows the pitcher in his motion at time $t_2$, FIG. 1D shows the pitcher in his motion at time $t_3$, while FIG. 1E shows the pitcher in his motion at time $t_4$. At to, the baseball 102 appears in the lower-left portion of the captured frame, at $t_1$ the baseball 102 has translated up and to the right of the position of the baseball 102 at to, at $t_2$ the baseball 102 has again translated up and to the right of the position of the baseball 102 at $t_1$, at $t_3$ the baseball 102 is nearly in the center of the captured frame, and at $t_4$ the baseball 102 is in the center of the frame and has just been released by the pitcher. As shown in this exemplary sequence of images, the camera that captured these images is positioned such that the camera is in-line with the baseball 102 and the center of the strike zone at the release point of the ball. While such alignment may be exemplary, it would be readily apparent to one of ordinary skill given the contents of the present disclosure that other such positioning may be used in addition to, or alternatively than, this exemplary alignment (e.g., at a 45° angle in front of the pitcher on the side of the pitcher's throwing arm. See e.g., FIG. 3).

The framerate captured by the camera may capture images at two thousand (2,000) frames per second (fps) in some implementations. However, in other variants the framerate captured by the camera may capture images at a higher framerate (e.g., three thousand (3,000) fps or faster). Conversely, in some implementations the framerate captured may capture images at a lower framerate (e.g., one hundred twenty (120) fps, two hundred forty (240) fps, and/or sixty (60) fps, etc.). In some implementations, the baseball 102 (or immediate area surrounding the baseball 102) may be segmented out from the background scenery via use of a thresholding image processing technique. As a brief aside, thresholding may take a captured scene and may analyze the pixels of the captured scene to determine one or more objects of interest. The analysis of the pixels of the captured scene may be traversed sequentially from left-to-right, followed by top-to-bottom for each frame of the captured scene. Via this traversal of pixels, the positioning of the baseball within the captured scene may be determined as the pixel values of the baseball may be expected within a certain range of pixel values as compared with the pixel values of the background scene. In some implementations, the background colors for the background scene may be chosen so that there is increased contrast between the baseball and the background scene. However, in many common scenarios for image capture (e.g., within a gym on a baseball field, etc.), the contrast between the pixel values associated with the baseball and the pixel values associated with background scene are typically different enough that the positioning of the baseball can be quickly and reliably determined.

In the specific example illustrated in FIGS. 1A-1E, the analysis of the pixel values may be performed in a left-to-right and bottom-to-top manner for right-handed pitchers, while the analysis of the pixel values may be performed in a right-to-left and bottom-to-top manner for left handed pitchers. For example, as seen in FIG. 1A, the baseball 102 is being pitched by a right-handed pitcher and accordingly, the baseball 102 at time to will be expected to appear in left-hand bottom corner portion of the captured scene. However, if the baseball 102 is being pitched by a left-handed pitcher, the baseball at time to will be expected to appear in the right-hand bottom corner portion of the captured scene. Accordingly, the analysis for determination of the positioning of the baseball may be optimized by knowing whether the pitcher is right-handed or left-handed prior to performing the per-pixel thresholding analysis.

Once a pixel value has been determined to be a pixel value associated with a baseball 102 (i.e., within a predetermined range of pixel values), the traversal may continue along, for example, a given row until pixel values associated with the baseball 102 are no longer being determined for a predetermined number of pixels (e.g., fifty (50) pixels, one-hundred (100) pixels, or two-hundred (200) pixels after loss of detection or any other suitable number of pixel values). Upon reaching this predetermined number of pixels without determining that any of the pixel values is of a baseball 102, the traversal from left-to-right (or right-to-left) may stop and the process may be repeated for the next row. Moreover, as the pixel analysis continues up (or down) the rows of the captured image, the pixel analysis may stop after a predetermined number of rows upon a loss of detection of the baseball 102. In other words, the analysis of the pixel values within the captured frame may intelligently determine the positioning of the baseball 102 without requiring that the entire frame be analyzed, thereby significantly improving upon the speed of the analysis (as well as reducing memory and processing requirements) for determining the positioning of the baseball 102 within the captured scene. In some implementations, the determination of the positioning of the baseball 102 within a given frame may be utilized in the analysis for the determination of the positioning of the baseball 102 in a subsequent (or preceding) frame. In other words, because the expected motion of the baseball 102 is known, the amount of pixels that require analysis within a given captured frame may be reduced as compared with the entire captured frame, thereby significantly reducing the number of processing steps as well as reducing the memory requirements for the analysis of the captured scene. While the aforementioned example should be considered exemplary, it would be readily apparent to one of ordinary skill given the contents of the present disclosure that the entire frame may be analyzed in some implementations, especially where processing complexity and memory requirements are not a design constraint for the computing device performing the thresholding analysis.

In some implementations, it may be desirable to begin the thresholding analysis with respect to the frame 100 depicted in, for example, FIG. 1E with subsequent analyses for temporally preceding frames being analyzed after the analysis of temporally later frames has been performed. For example, as shown in FIG. 1E the baseball 102 has been released from the hand of the pitcher and accordingly, pixel values associated with the baseball 102 will not be obscured by the pitcher's fingers. Accordingly, the number of pixels that have been determined to be of a baseball may be greater than the number of pixels associated with a prior captured scene in which the pitcher's fingers still obscure portions of the baseball 102. Moreover, due to camera positioning prior to image capture, the frame associated with the captured scene of FIG. 1E may be quickly determined as it would be expected that the baseball 102 would be present within the center of the captured scene. In other words, the center portion of the captured frames of FIGS. 1A-1E may be analyzed to determine the captured scene corresponding to baseball 102 release (i.e., the frame which has: (1) determined the positioning of the baseball 102 to be in (or near) the center of the captured scene; and (2) determined the maximum number of pixel values associated with the baseball 102 within the captured scene). Accordingly, the analysis may proceed backwards from the release point and may be constrained down and to the left for right-handed pitchers, or down and to the right for left-handed pitchers, etc.

Upon determination of the positioning of the baseball 102 within a given frame, the geometric center of the baseball may be determined. For example, in the exemplary frames 100 depicted within FIGS. 1A-1E, the geometric center of the baseball 102 is determined, and a box 104 is positioned around the baseball 102 with the geometric center of the box 104 being positioned at the geometric center of the baseball 102. The box 104 may not be physically positioned within the captured frames but may instead be representative of portions of the captured frame that are to be segmented from the captured images. In some implementations, the size of the box 104 may be based upon the predetermined number of pixels for which a baseball 102 has not been determined to be present as set forth above. Moreover, the box 104 may have a variety of aspect ratios. For example, the box 104 may have a 1:1 aspect ratio, a 4:3 aspect ratio, a 16:9 aspect ratio, and other suitable types of aspect ratio. The aspect ratio chosen may correspond to the aspect ratio of a display in some implementations. As shown in FIGS. 1A-1E, the exemplary box 104 is shown with a 1:1 aspect ratio. Additionally, the box 104 may have different dimensions dependent upon the overall size of the baseball 102 within a given frame. For example, in FIG. 1A the box 104 may be larger than the box 104 located within FIG. 1E. These varying sizes for the box may be associated with the size of the baseball within a given frame (i.e., in FIG. 1A, the baseball 102 may appear larger as it is geometrically closer to the lens of the image capture device then the baseball 102 shown in FIG. 1E). One reason for these boxes (or segmentations) is demonstrated with reference to FIGS. 2A-2F.

Referring now to FIGS. 2A-2F, the frames depicted in FIGS. 1A-1E have been scaled down and repositioned about the geometric center of the baseball. Specifically, the boxes 104 depicted in FIGS. 1A-1E now represent a segmented frame that is centered about the geometric center of the baseball. The transformations depicted in FIGS. 2A-2F allow for finger placement and rotations to be viewed more clearly as, for example, the natural translation movement of a thrown pitch has been removed from the frames depicted in FIGS. 2A-2F. In other words, the frames depicted in FIGS. 2A-2F allow for the understanding of rotation (spin) effects, while removing the linear (translational) effects associated with the pitching motion of the pitcher. Moreover, while the following discussion is primarily described in terms of determination of finger position and ball rotation, it would be readily understood that the following described principles may be applied to other portions of the anatomy (e.g., wrist position, wrist angle, arm angle, and other portions of the anatomy, etc.) or baseball orientation (e.g., seam position, etc.).

Figure 2A:
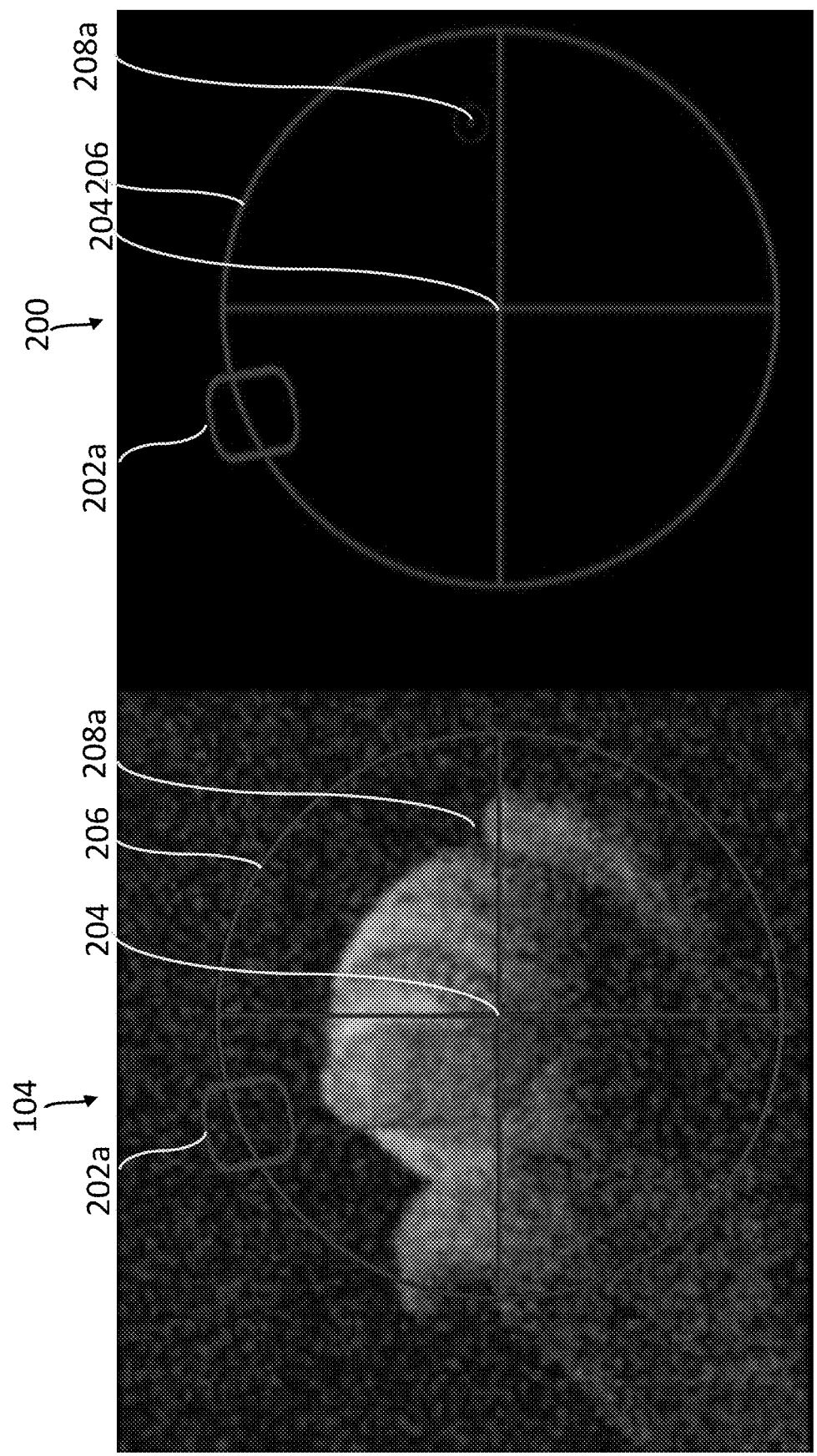
FIGS. 2A-2F are a series of analyses for the exemplary video capture of FIGS. 1A-1E, in accordance with the principles of the present disclosure.

FIG. 2A illustrates finger and baseball position at time to. As can be seen within the box 104, graphics have been overlaid onto the captured image. Specifically, a circle 206 with crosshairs 204 has been overlaid over the baseball 102, with the center of the crosshairs 204 being aligned with the determined geometric center of the baseball 102. The circumference of the circle 206 corresponds to the circumference of the baseball 102. Here the circumference of the circle 206 has been scaled up so that it is larger than the circumference of the baseball 102, although it would be appreciated that the circumference of the circle 206 could be sized so as to be the same as the circumference of the baseball 102. In some implementations, the circumference of the circle 206 could even be smaller than the circumference of the baseball 102. Regardless of the size of the circumference of the circle 206, the center of the crosshairs 204 is aligned with the geometric center of the baseball 102 and the positioning of the fingers as well as the markers on the baseball 102 are scaled proportionally with the scaling, if done, of the circle 206.

The segmented box 104 may also include a marker 202a for the middle finger of the pitcher as well as marker 208a which is representative of a marker located on the baseball itself. These markers 202a and 208a may correspond to passive markers located on the middle fingernail and baseball, respectively. As a brief aside, passive markers are typically a coating that utilizes a retroreflective material that is configured to reflect light that is generated near the camera lens. Through the use of passive markers, the aforementioned threshold image post-processing techniques can be applied so that only the bright reflective markers 202, 208 will be sampled with the remaining portions of the image (remainder of the hand, background, baseball, etc.) being ignored or discarded. This is illustrated in the projection 200 illustrated in FIG. 2A where the background image has been removed with all that remains being the overlaid circle 206, overlaid crosshairs 204 and overlaid passive markers 202a, 208a.

In the illustrated example, the fingernail of the pitcher's middle finger includes the passive marker as the pitch being thrown is a changeup, in particular a variation of what is known as a "circle change". This particular change up grip is identified through the placement of the thumb and forefinger where they touch in such a way that they create a "circle" on the side of the baseball. In other pitch variants, such as a slider, the passive marker may be placed on the forefinger, or any other finger that is determined to be of importance for that particular pitch or the desired perspective for a given pitch. In some variants, such as the two-camera (or more) variant depicted in FIG. 3, two or more fingers may include passive markers so that they can both be tracked (e.g., the thumb and middle finger, the thumb and forefinger, forefinger and ring finger, etc.). In some implementations, passive markers may be utilized at a variety of locations (e.g., a portion of the finger nail (as opposed to the entire finger nail)), on the distal phalange of the finger of interest, on the middle phalange of the finger of interest, and/or the proximal phalange of the finger of interest. These and other variants would be readily apparent to one of ordinary skill given the contents of the present disclosure.

In some implementations, the passive markers may be obviated in favor of so-called "active markers". As a brief aside, active optical systems track the position of objects of interest using light sources such as light-emitting diodes. These light sources are the active markers themselves and since they emit light, as opposed to reflecting light as with passive markers, the objects of interest may be tracked with a higher signal-to-noise ratio, resulting in very low marker jitter and higher resolution tracking of the object. While active markers may be used, the use of passive markers may be advantageous as they are often less bulky, thereby resulting in a more natural feel for the pitcher when the pitcher executes his/her throwing motion.

Figure 2B:
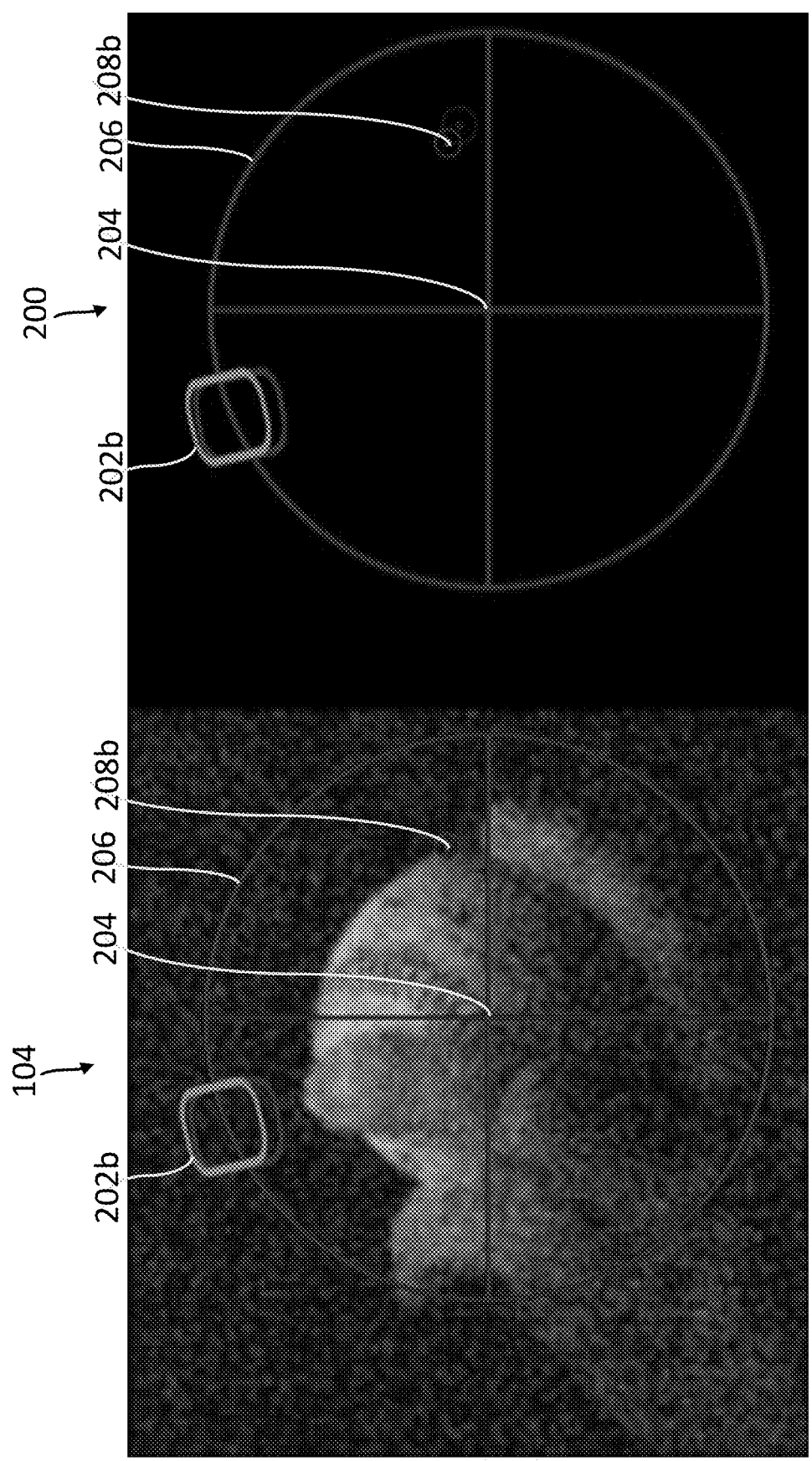
Figure 2C:
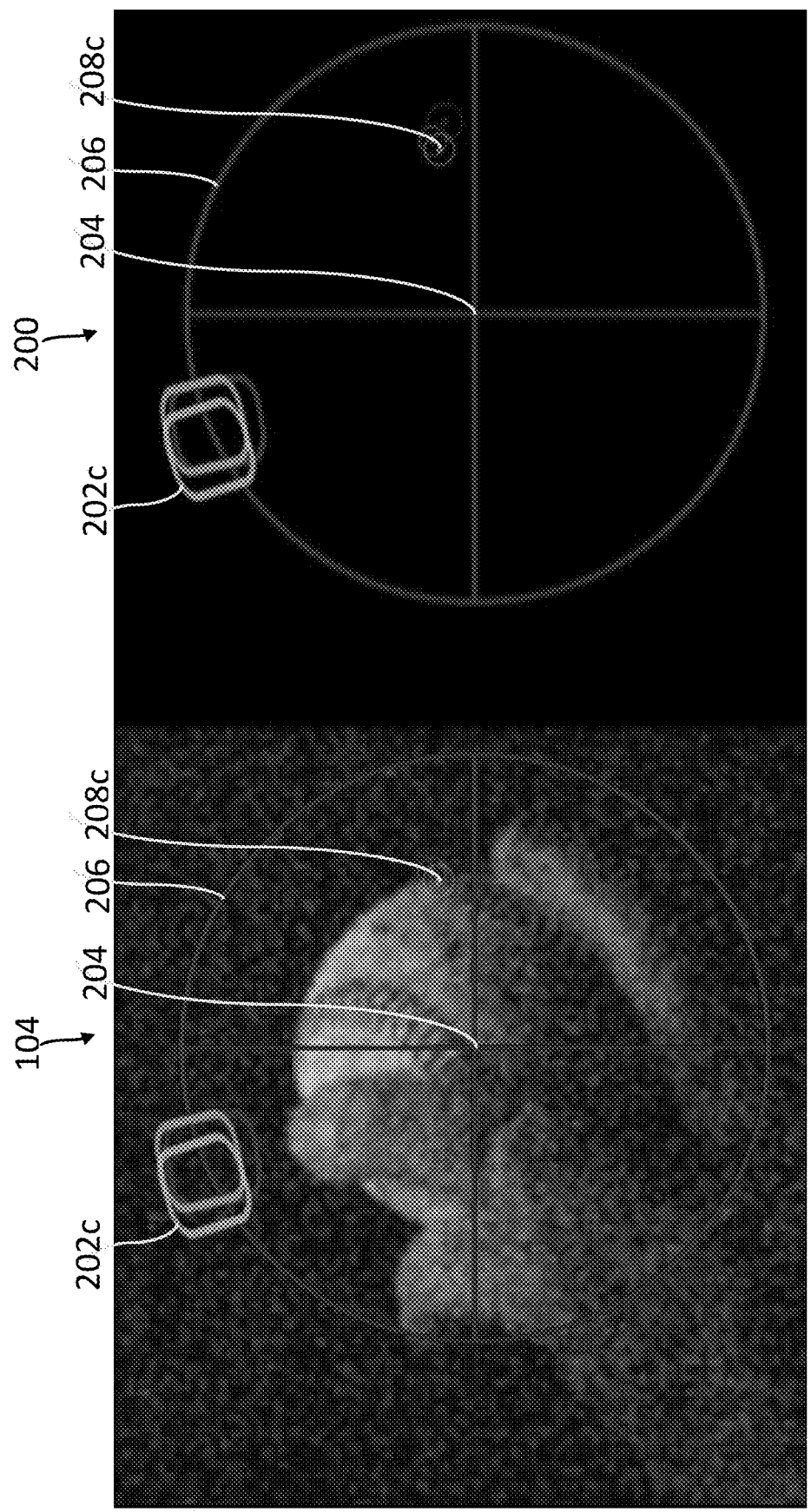
Figure 2D:
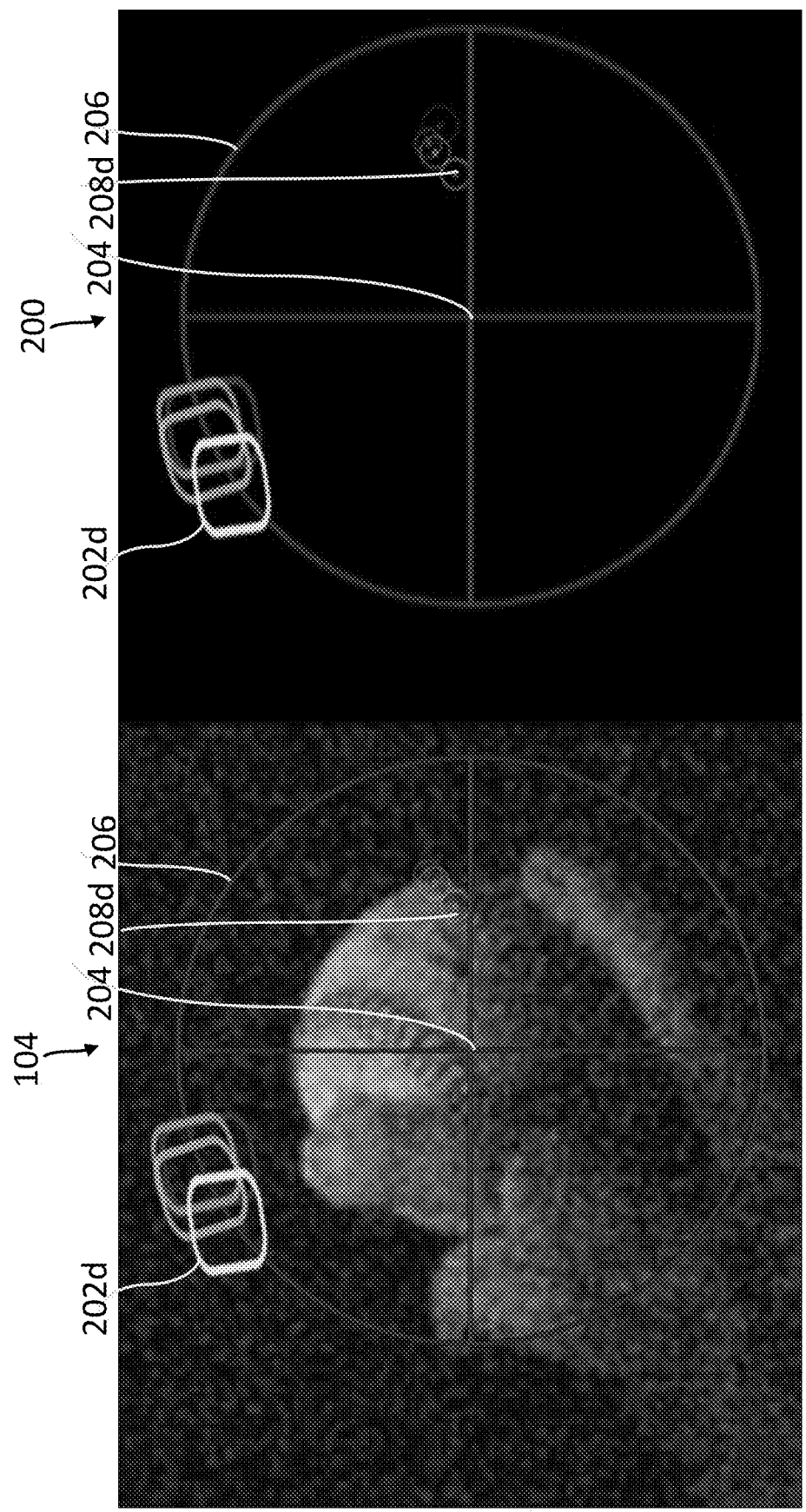
Figure 2E:
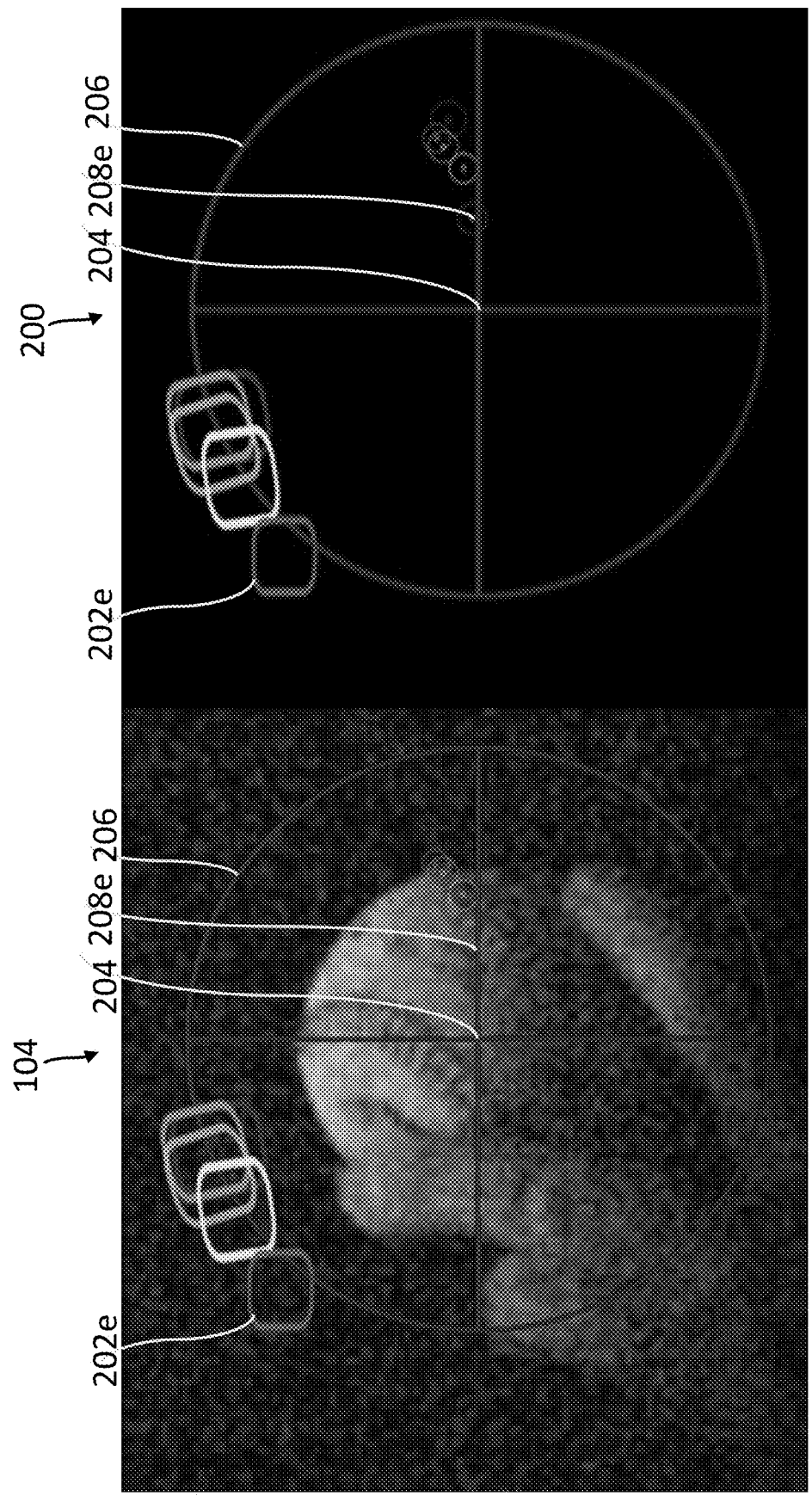
Figure 2F:
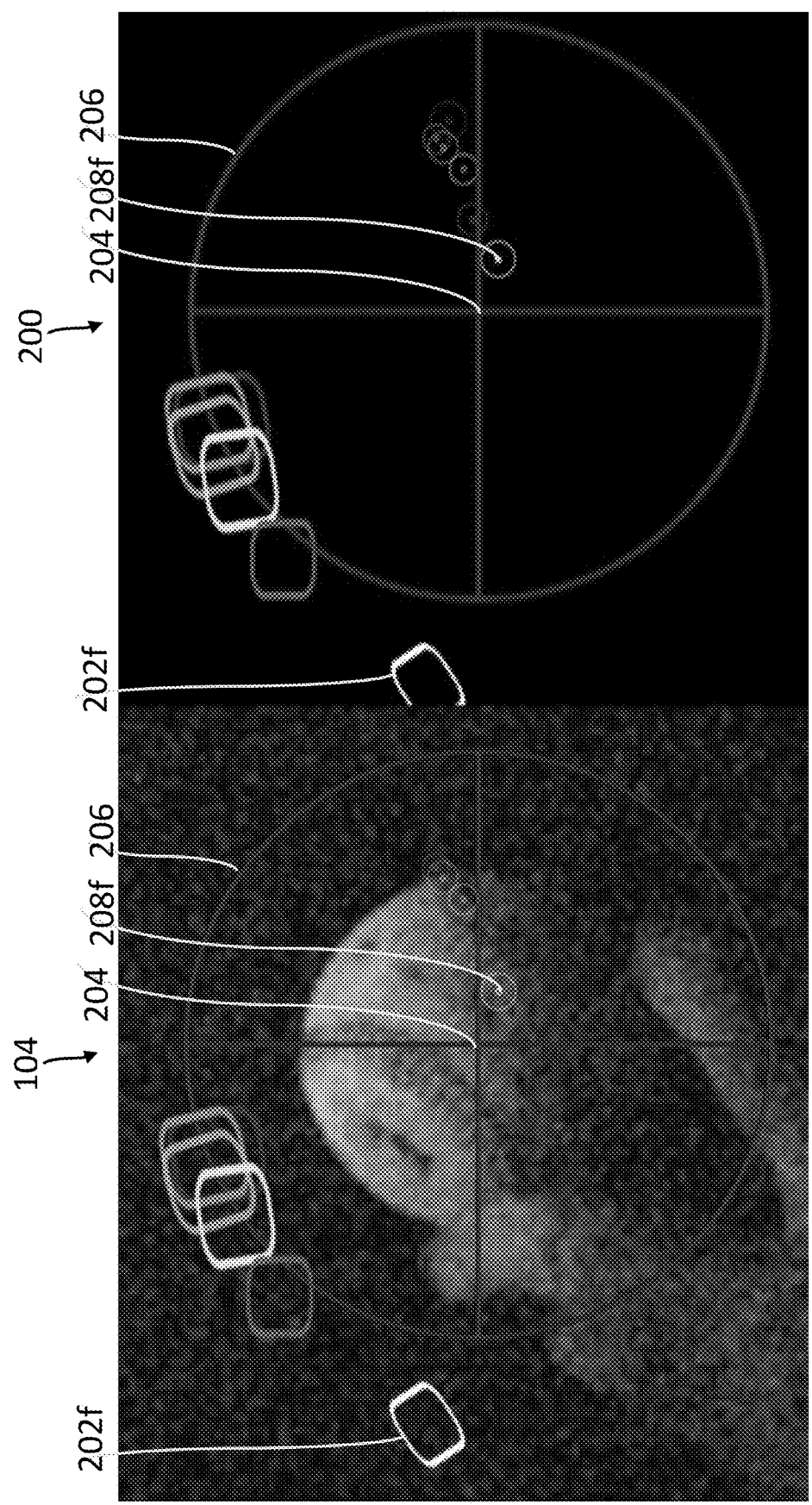

Using the aforementioned thresholding image processing technique, FIG. 2B illustrates finger and baseball position at time $t_1$. As can be seen in FIG. 2B, markers 202b and 208b have been overlaid onto the captured image and are representative of the middle finger and ball position at time $t_1$. In some implementations, such as that illustrated in FIG. 2B, markers 202a, 208a (from time to) are included along with markers 202b, 208b. FIG. 2C illustrates finger and baseball position at time $t_2$ and now includes markers 202c and 208c which is indicative of the positioning of these markers at time $t_2$. FIG. 2D illustrates finger and baseball position at time $t_3$ and now includes markers 202*d* and 208*d* which is indicative of the positioning of these markers at time $t_3$. FIG. 2E illustrates finger and baseball position at time $t_4$ and now includes markers 202*e* and 208*e* which is indicative of the positioning of these markers at time $t_4$. FIG. 2F illustrates finger and baseball position at time is and now includes markers 202*f* and 208*f* which is indicative of the positioning of these markers at time $t_5$. In FIG. 2F, the positioning of marker 202*f* outside of the circle 206 is indicative of the fact that the middle finger has now come off the baseball. More or fewer tracked positions at more or fewer time instances may be tracked in other implementations with the foregoing example of FIGS. 2A-2F merely being exemplary. In some implementations, thresholding operations may be performed on, for example, the segmented frames illustrated in FIGS. 2A-2F in order to identify seam location on the baseball 102 in addition to, or alternatively than, the aforementioned passive (or active) markers placed on the baseball 102. By performing the thresholding analysis for identification of the seams after segmentation of the frames, processing and memory resources are reduced, although it would be readily appreciated that this identification and determination of the position of the seams may also be performed with the frames 100 depicted in FIGS. 1A-1E in embodiments in which processing or memory resource limitations are not a constraint for the design of the system.

Herein lies a salient advantage of the present disclosure over prior tracking techniques that merely tracked speed, spin axis, and/or spin rate. Namely, the present disclosure not only can track these parameters (i.e., speed, spin axis, and/or spin rate) after the ball has been released which may be indicative of performance and effectiveness for the pitch, but may also track how the pitch performance and effectiveness has been achieved. Accordingly, when effective movement has been achieved, these parameters have been captured and can be compared against parameters that are captured in the future (or the past) thereby providing feedback to the pitcher about how to achieve that effective movement. The tracking system of the present disclosure may also provide near-immediate feedback resulting in more consistency with a given pitch than prior art tracking techniques. As previously mentioned, the foregoing example may readily be applied to track other parameters (e.g., wrist position, wrist angle, seam placement, etc.). These and other variants would be readily apparent to one of ordinary skill given the contents of the present disclosure.

Exemplary Tracking Systems

Figure 3:
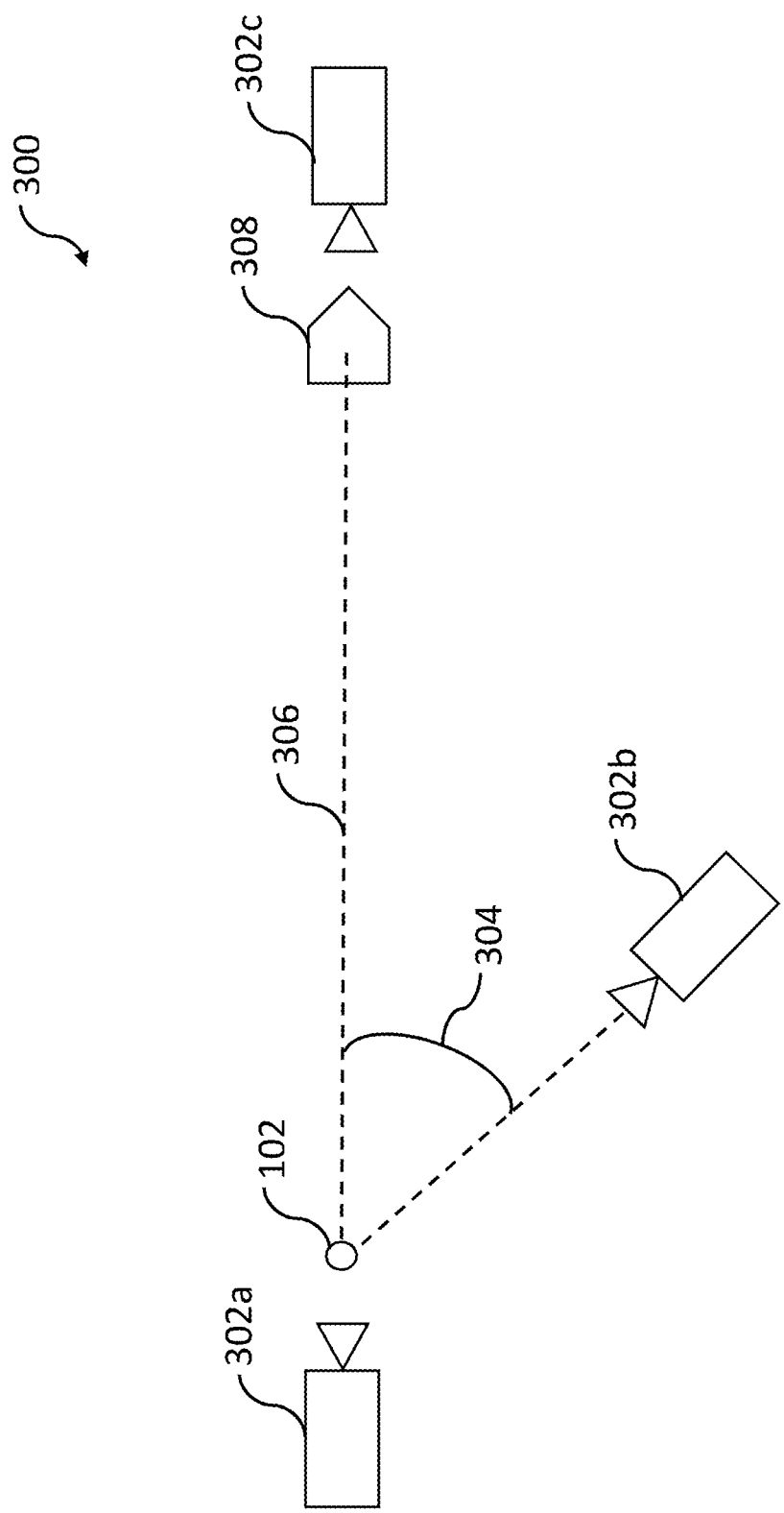
FIG. 3 is an exemplary tracking system for image capture of pitched baseballs, in accordance with the principles of the present disclosure.

The functionality of the various aspects of the system of FIG. 3 described herein may be implemented through the use of software executed by one or more processors (or controllers) and/or may be executed via the use of one or more dedicated hardware modules, with the architecture of the system being specifically optimized to execute the methodologies or processes described herein. The use of computing systems is essential as slight variations in finger, hand, wrist positioning, and the like as well as the timing of movements involved with the pitching motion are not detectable by humans with the degree of accuracy necessary in order to distinguish between, for example, average pitch movement and highly effective pitch movement. It is in this context that the use of, for example, software in combination with, for example, relatively high frame-rate cameras and computing systems improves upon the determination of how to achieve the outcome of desired pitch movement.

The software disclosed herein is intended to be executed by a computing system that reads instructions from a computer-readable medium and executes these instructions in one or more processors (or controllers), whether off-the-shelf processors or custom processors. The computing system may be used to execute instructions (e.g., program code or software) for causing the computing system to execute the computer code described herein. In some implementations, the computing system operates as a standalone device or a connected (e.g., networked) device that connects to other computer systems.

The computing system may include, for example, a smartphone, a personal computer (PC), a tablet PC, a notebook computer, or other device capable of executing instructions (sequential or otherwise) that specify actions to be taken. In some implementations, the computing system may include a server. In a networked deployment, the computing system may operate in the capacity of a server or client in a server-client network environment, or as a peer device in a peer-to-peer (or distributed) network environment. Moreover, a plurality of computing systems may operate to jointly execute instructions to perform any one or more of the methodologies discussed herein. For example, a smart phone computing system may be responsible for image capture, while a remote computing system (e.g., computing systems operating within the "cloud") may perform the imaging analysis.

An exemplary computing system includes one or more processing units (generally processor apparatus). The processor apparatus may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system may also include a main memory. The computing system may include a storage unit. The processor, memory and the storage unit may communicate via a bus.

In addition, the computing system may include a static memory, a display driver (e.g., to drive a plasma display panel (PDP), a liquid crystal display (LCD), a projector, or other types of displays). The computing system may also include input/output devices, e.g., an alphanumeric input device (e.g., touch screen-based keypad or an external input device such as a keyboard), a dimensional (e.g., 2-D or 3-D) control device (e.g., a touch screen or external input device such as a mouse, a trackball, a joystick, a motion sensor, or other pointing instrument), a signal capture/generation device (e.g., a speaker, camera, and/or microphone), and a network interface device, which may also be configured to communicate via the bus.

Embodiments of the computing system corresponding to a client device may include a different configuration than an embodiment of the computing system corresponding to a server. For example, an embodiment corresponding to a server may include a larger storage unit, more memory, and a faster processor but may lack the display driver, input device, and dimensional control device. An embodiment corresponding to a client device (e.g., a personal computer (PC)) may include a smaller storage unit, less memory, and a more power efficient (and slower) processor than its server counterpart(s).

The storage unit includes a computer-readable medium on which is stored instructions (e.g., software) embodying any one or more of the methodologies or functions described herein. The instructions may also reside, completely or at least partially, within the main memory or within the processor (e.g., within a processor's cache memory) during execution thereof by the computing system, the main memory and the processor also constituting computer-readable media. The instructions may be transmitted or received over a network via the network interface device.

While computer-readable medium is shown in an example embodiment to be a single medium, the term "computer-readable medium" should be taken to include a single medium or multiple media (e.g., a centralized or distributed database, or associated caches and servers) able to store the instructions. The term "computer-readable medium" shall also be taken to include any medium that is capable of storing instructions for execution by the computing system and that cause the computing system to perform, for example, one or more of the methodologies disclosed herein.

Referring now to FIG. 3, an exemplary tracking system 300 is shown and described in detail. In some implementations, the system 300 includes multiple cameras 302. Camera 302a is configured to capture video such as, for example, the captured frames 100 depicted in FIGS. 1A-1E. As previously discussed, the positioning of camera 302a may be aligned such that the baseball 102, at the release point for a given pitcher, is positioned between the center of the strike zone located at home plate 308 and the center of the captured field of view for camera 302a. A second camera 302b may be utilized in some implementations. The second camera 302b is configured to capture the release point of the baseball 102, similar to that field of view captured by camera 302a. However, camera 302b captures the release point of the baseball 102 from a different vantage point than that image captured by camera 302a. For example, in the series of frames 100 depicted in FIGS. 1A-1E, the second camera 302b may be configured to track the movement of the thumb of the pitcher as the baseball 102 obscures the view of the thumb for camera 302a.

The second camera 302b is positioned in front of the release point for the baseball 102, while the first camera 302a is positioned as described supra. In some implementations, the second camera 302b is positioned at an angle 304 that is offset from the path 306 of the pitched baseball 102. The angle 304 of offset may be chosen to provide the second camera 302b with a clear view of the anatomy of interest for the pitcher. For example, as shown in FIG. 3, the positioning of the second camera 302b is intended to capture pitches thrown from a right-handed pitcher. However, if the second camera 302b was positioned to capture pitches thrown from a left-handed pitcher, the second camera 302b may be positioned on the opposite side of the path 306 of the pitched baseball 102. In some implementations, the angle 304 of offset may be established at approximately 45°, although it would be readily apparent that this established angle 304 may be varied in accordance with the desired field of view for a given pitch.

A third camera 302c may be utilized in some implementations of system 300. The third camera 302c is configured to capture the baseball 102 in the area surrounding home plate 308. While the third camera 302c is shown as being positioned behind home plate 308 in FIG. 3, it would be readily apparent to one of ordinary skill given the contents of the present disclosure that this positioning may be varied dependent upon the preferences of the individual capturing the field of view for the third camera 302c. Unlike the field of view captured by the first camera 302a and the second camera 302b, the third camera 302c is not intended to capture the anatomy of the pitcher in his throwing motion. Rather, the third camera 302c is intended to capture the baseball 102 in the area immediately surrounding home plate 308. The utilization of the third camera 302c in combination with the first camera 302a and/or the second camera 302, allows for the determination of the axis of spin as well as the spin rate at both the release point of the baseball 102 as well as a point when the baseball 102 is near home plate 308. In other words, the third camera 302c allows one to determine whether the axis of spin for the baseball 102 has degraded as the baseball 102 has followed its flight path 306 towards home plate 308. One or more additional cameras 302 may be utilized with the system 300 in some implementations. These one or more additional cameras 302 may be placed along various points along the flight path 306 of the baseball 102 in order to provide additional information about the axis of spin for the baseball 102 as well as spin rate along various portions of the flight path 306.

The one or more cameras 302 utilized in the system 300 may consist of high-speed cameras that are intended to capture video at one or more high-speed frame rates (e.g., 1,000 fps, 2,000 fps, and/or 3,000 fps, etc.). In some implementations, one or more of the cameras 302 may consist of smart phone cameras. In some implementations, one or more of the cameras may consist of standalone action cameras. The software disclosed herein with reference to FIGS. 2A-2F may be incorporated within the cameras 302 in some implementations. In variants, the cameras 302 may only be utilized for image capture and the captured images (captured frames) may be offloaded from the cameras 302 via a wired or wireless network interface. These offloaded frames of captured images may then be processed on a computing device. These and other variants would be readily apparent to one of ordinary skill given the contents of the present disclosure.

Exemplary Methodologies

Figure 4:
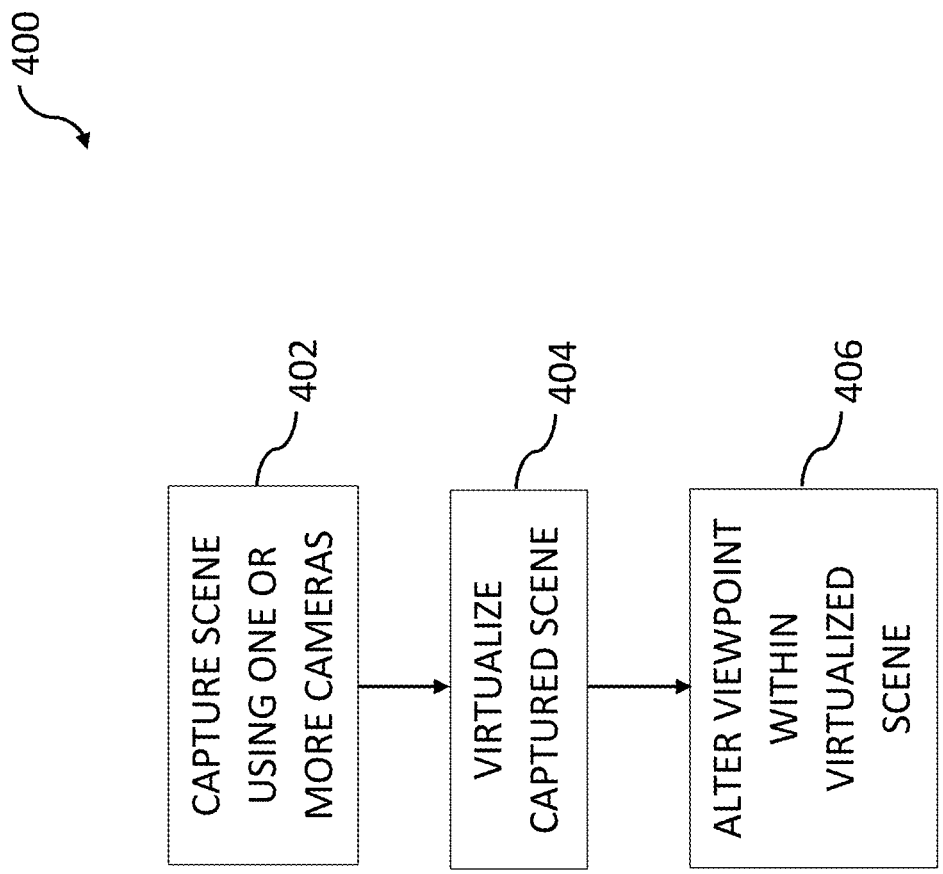
FIG. 4 is a logical flow diagram illustrating one exemplary methodology for utilizing data captured by, for example, the exemplary tracking system of FIG. 3 in order to provide additional information about the moving object, in accordance with the principles of the present disclosure.

Referring now to FIG. 4, one exemplary methodology 400 for utilizing data captured by, for example, the exemplary tracking system 300 of FIG. 3 to provide additional information about the moving object is shown and described in detail. At step 402, a scene is captured using one or more cameras. For example, one camera may capture the release point of a pitched baseball from behind the pitcher's throwing arm. Another camera may capture the release point of a pitched baseball from a vantage point that is in front of the pitcher and offset from the path of flight for the pitched baseball. Yet another camera may capture the pitched baseball at an intermediate point along the path of flight for the pitched baseball. Yet another camera may capture the pitched baseball near the end of its path of flight.

At step 404, the captured scene is graphically virtualized. For example, the features and geometry of a baseball are known and well-understood. Accordingly, an image captured of a moving baseball from one vantage point (e.g., camera 302a in FIG. 3) enables one to recreate other vantage points for the baseball that have not been captured by the camera. In other words, one image of a baseball from a single vantage point enables one to reconstruct the baseball from any other vantage point. Similarly, the hand and wrist of a pitcher may be known and accordingly, the capture of an image from one or more vantage points enables the virtual generation of the entire geometry of the hand from any other vantage point. The captured scene may be virtualized for each captured frame, or a subset of the captured frames.

At step 406, once the captured scene has been virtualized, viewpoints in the virtualized scene may be altered. For example, the axis of spin may be determined from the captured scene and the viewpoint may reside on either end of the axis of spin. Accordingly, the baseball may now be viewed from this altered viewpoint through one or more rotations of the baseball. The same technique may be applied to any other viewpoint of interest. A given viewpoint may be altered multiple times within a given captured scene.

Moreover, once a given viewpoint has been established additional viewpoints may be established by incrementing the viewpoint in three distinct dimensions. For example, a viewpoint may be created by incrementing along a given three-dimensional coordinate system (e.g., increment the viewpoint on the x-axis by five (5) degrees, while incrementing on the y-axis by twenty-seven (27) degrees, etc.). Once the new viewpoint has been established, the baseball may now be viewed through one or more rotations (or partial rotations) from this new viewpoint.

In addition to virtualizing a single captured scene, two or more captured scenes may be virtualized. These two or more captured scenes may be displayed next to one another while each of the two or more captured scenes may be individually viewed from any desired viewpoint. For example, two virtualized scenes created from two different pitches may be viewed from the same (or differing) viewpoints. For each of these two or more virtualized scenes, the viewpoint axis may be locked in place and the scene may be viewed through one or more rotations of the baseball. In addition to customizable viewpoints, the two or more captured scenes may be replayed in lock step with one another at a variety of playback rates (e.g., in so-called slow-motion). While it may be advantageous to replay two or more captured scenes in lockstep, they may be replayed at differing instances of time and/or at differing playback rates in certain implementations.

Additionally, using multiple captured scenes of the same pitch may allow for the determination of whether the axis of spin degrades along the flight path of the ball. For example, the axis of spin may be separately determined at various points along the flight path of the ball and the axis of spin at each of these various points may be output in a graphical form. One exemplary graphical output is depicted within FIG. 5 which includes the distance from the release point, the axis of spin at various points along this distance, the spin-rate for the baseball at various points along this distance, as well as the velocity at various points along this distance.

Finger placement as a function of both (i) position as well as (ii) seam orientation may also be determined from the virtualized scene as well. Finger placement may also be determined over multiple frames of the captured scene as well (e.g., at ball separation from the hand and twenty frames prior to ball separation as but one non-limiting example). This determined finger placement may also be compared against the subjective effectiveness of the pitch. Accordingly, finger placement and seam orientation may be compared against the subjective effectiveness of the pitch over a given number of pitches to aid in determining how to recreate the most effective pitch. Such information may be useful in assisting in increased effectiveness and consistency for a given pitch. Wrist angle with respect to hand angle may be determined as well. Again, comparing wrist angle with respect to hand angle may be utilized to assist with increased consistency for a given pitch.

This virtualized scene may also be utilized to assist in computational fluid dynamics (CFD) calculations. For example, the CFD parameters associated with an "effective" pitch may be compared against the CFD parameters associated with a less-effective pitch (or less-effective pitches). These CFD parameters may also be used to help determine how to make the pitch more effective, even if the pitcher has not yet even thrown the pitch. In other words, the CFD parameters may indicate a different seam placement, a different finger placement during release, a different wrist angle, etc. Accordingly, data captured during pitching sessions may be utilized to detail theoretical pitching mechanics that may assist the pitcher in obtaining more effective pitches. Moreover, environmental factors (e.g., temperature, elevation, and other weather conditions) may utilized in combination with the system 300 to assist with determining theoretical pitching mechanics in a variety of conditions. These and other variants would be readily apparent to one of ordinary skill given the contents of the present disclosure.

Figure 6:
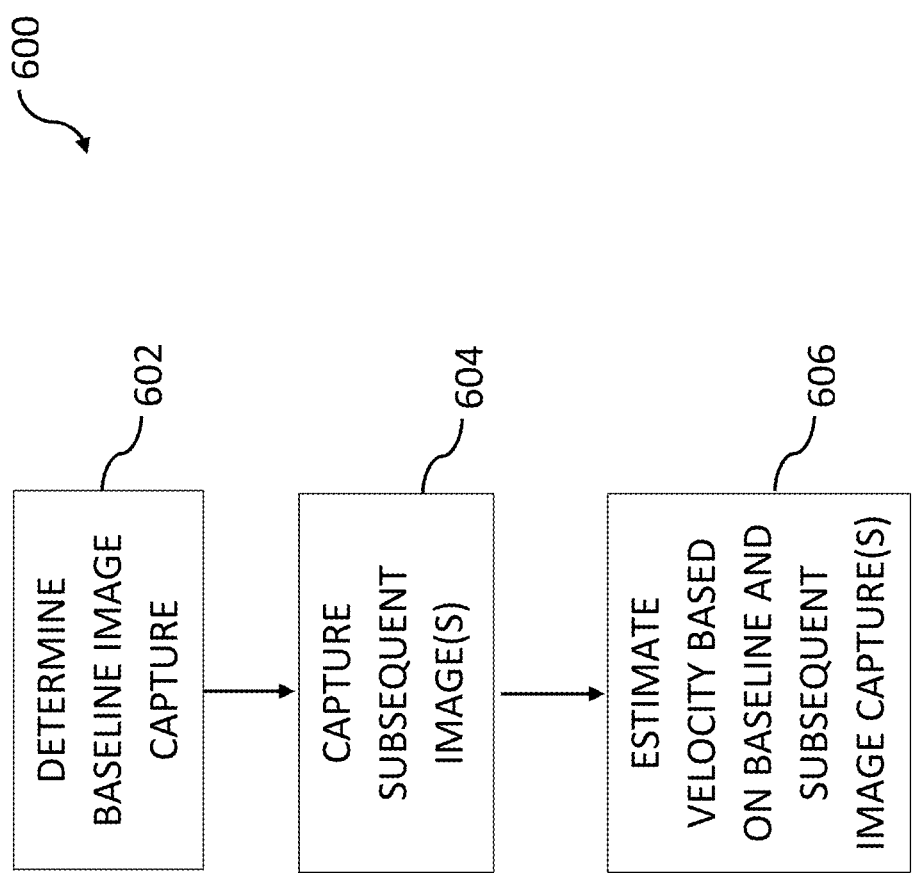
FIG. 6 is a logical flow diagram illustrating one exemplary methodology for estimating velocity based on baseline and subsequent image capture(s), in accordance with the principles of the present disclosure.

Referring now to FIG. 6, one exemplary usage scenario for the system of, for example, FIG. 3 is shown and described in detail. Specifically, the exemplary methodology 600 of FIG. 6 may be utilized in addition to, or alternatively than, the methodologies and functionality described herein with respect to FIGS. 1A-1E, 2A-2F, 4 and 5.

Specifically, FIG. 6 describes a methodology 600 for the estimation of pitch velocity based on captured images. Such a methodology 600 may prove to be a much more cost-effective system than acquiring more advanced velocity capture apparatus (e.g., a radar gun). At step 602, the parameters associated with baseline image capture may be determined. In some implementations, the positioning of camera 302a behind the release point of the baseball may be pre-established. For example, the positioning of camera 302a may be established a set distance (e.g., five (5) feet or some other specified distance) behind the release point of the baseball.

In some implementations, the baseline of the image capture may be determined from camera metadata. For example, camera metadata may include lens parameters, captured framerate, field of view (FOV) parameters, etc. Using this camera metadata, an image captured of a baseball at, for example, the release point of the baseball may allow software located on, or associated with, camera 302a to determine the distance between the camera 302a and the baseball at a given time instance (e.g., at time $t_n$). This distance may be determined as the geometry of the baseball is known and the camera metadata allows the software to determine the overall dimensions of the baseball (e.g., the diameter) as a function of the parameters associated with the camera metadata.

At step 604, one or more subsequent images for the baseball are captured subsequent to the baseline image capture. For example, images may be captured at times $T_{n+1}$, $T_{n+2}$, $T_{n+3}$, etc. At these subsequent times, the distance of the baseball from the camera lens may be determined as the captured images of the baseball will show the baseball progressively getting, for example, smaller and smaller. In other words, the dimensions of the baseball (e.g., the diameter of the baseball) will appear to be smaller in the captured images as the baseball gets further and further away from the camera 302a. In some implementations, the captured images may be taken from the perspective of camera 302c, which is located behind home plate. In such a variant, the dimensions of the baseball will appear to grow larger and larger as the baseball travels along path 306. These and other variants would be readily apparent to one of ordinary skill given the contents of the present disclosure.

At step 606, the velocity of the baseball will be estimated based on the baseline image capture and the one or more subsequent image captures. As discussed previously herein, the distance of the baseball to the camera lens may be estimated at various points in time. Using these distance estimations, as well as the framerate of the camera, the software may be able to estimate the velocity of the pitched baseball. In other words, these estimated distances of the baseball from the camera lens may be divided by the time between the captured frames to provide an estimated velocity for the pitched baseball. Such an implementation may be desirable as it allows, for example, a pitcher to determine the speed of his/her pitches using, for example, a smartphone with an application (e.g., software) disposed thereon. In other words, the velocity of the pitcher's pitches may be determined more cost effectively than investing in more costly and advanced velocity capture apparatus (e.g., a radar gun).

Exemplary Implementation Examples

The techniques described herein may be utilized in any number of contexts. For example, embodiments disclosed herein may be readily utilized to assist a pitcher in achieving more consistency with a given pitch. These given pitches may consist of a four-seam fastball, a two-seam fastball, a cutter, a splitter, a forkball, a curveball, a slider, a slurve, a screwball, various types of changeups (e.g., a circle changeup, a palmball, etc.), and even knuckleball pitches. While the previously discussed usage scenarios may be considered exemplary, it would be readily apparent to one of ordinary skill given the contents of the present disclosure that other usage scenarios may be utilized as well.

For example, data associated with various types of pitches as well as various professional pitchers may be stored with the software. Accordingly, others would have the opportunity to compare their captured pitching mechanics and compare these captured pitching mechanics against a particular pitcher's pitches. For example, a college or highschool player looking to imitate a particular type of pitch or a particular type of pitcher would have the opportunity to do so using the software described herein. For example, a youth pitcher may have the opportunity to attempt to mimic a highly effective major league pitcher (e.g., Greg Maddux's changeup, Mariano Rivera's cutter, Clayton Kershaw's slider, etc.). In other words, the parameters captured of the youth pitcher's pitch may be compared against a professional player's pitch, etc.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A computer-implemented method for comparing performance with respect to a plurality of pitched baseballs, comprising the steps of:
    capturing a first plurality of frames of a scene of a pitched baseball;
    segmenting an object of interest out of the captured scene by performing a thresholding operation on a pixel-by-pixel basis to determine a location of the object of interest within a first frame of the first plurality of frames and utilizing the determined location of the object of interest within the first frame to assist in determining a location of the object of interest within a second frame of the first plurality of frames;
    analyzing the segmented scene to identify markers associated with the object of interest;
    retrieving a second plurality of frames of a prior captured scene of a pitched baseball; and
    comparing the analyzed scene with the prior captured scene to enable a comparison in performance for the pitched baseball.

2. The computer-implemented method of claim 1, wherein the analyzing of the segmented scene further comprises determining speed, spin axis, spin rate and finger placement with respect to the object of interest.

3. The computer-implemented method of claim 2, wherein the comparing of the analyzed scene with the prior captured scene further comprises comparing the determined speed, spin axis, spin rate and finger placement with a speed, spin axis, spin rate and finger placement of the prior captured scene.

4. The computer-implemented method of claim 3, wherein the performing of the thresholding operation on the pixel-by-pixel basis comprises starting the thresholding operation in an area of the captured scene dependent upon a handedness for a pitcher of the pitched baseball.

5. The computer-implemented method of claim 3, wherein the performing of the thresholding operation on the pixel-by-pixel basis for the second frame of the first plurality of frames is only performed on a subset of pixels of the second frame.

6. The computer-implemented method of claim 5, wherein the determining of the location of the object of interest comprises determining that a pixel value for a pixel within the first frame is within a predetermined range of pixel values.

7. The computer-implemented method of claim 3, wherein the segmenting of the object of interest out of the captured scene further comprises repositioning the object of interest within the segmented scene within each of the first plurality of frames.

8. The computer-implemented method of claim 3, wherein the analyzing of the segmented scene further comprises performing a second thresholding operation on the segmented scene to identify the markers associated with the object of interest.

9. The computer-implemented method of claim 8, wherein the performing of the second thresholding operation comprises determining placement of a finger with respect to a geometric center of the pitched baseball.

10. The computer-implemented method of claim 9, wherein the performing of the second thresholding operation further comprises determining seam orientation with respect to the geometric center of the pitched baseball.

11. A non-transitory computer-readable storage apparatus comprising a plurality of instructions, that when executed by a processor apparatus, are configured to:
- receive a first plurality of frames of a captured scene of a pitched baseball;
- segment out an object of interest within the captured scene via performance of a thresholding operation on a pixel-by-pixel basis to generate a subset of the captured scene of the pitched baseball, the performance of the thresholding operation on the pixel-by-pixel basis comprises determination of a location of the object of interest within a first frame of the first plurality of frames of the captured scene and utilization of the determined location of the object of interest within the first frame to assist in determination of a location of the object of interest within a second frame of the first plurality of frames;
- analyze the segmented scene to identify markers associated with the object of interest;
- retrieve a second plurality of frames of a prior captured scene of a pitched baseball; and
- compare the analyzed scene with the prior captured scene to enable a comparison in performance for the pitched baseball.

12. The non-transitory computer-readable storage apparatus of claim 11, wherein the analysis of the segmented scene further comprises a determination of speed, spin axis, spin rate and finger placement with respect to the object of interest.

13. The non-transitory computer-readable storage apparatus of claim 12, wherein the comparison of the analyzed scene with the prior captured scene further comprises a comparison of the determined speed, spin axis, spin rate and finger placement with a speed, spin axis, spin rate and finger placement of the prior captured scene.

14. The non-transitory computer-readable storage apparatus of claim 13, wherein the performance of the thresholding operation on the pixel-by-pixel basis comprises commencement of the thresholding operation in an area of the captured scene that is dependent upon a handedness for a pitcher of the pitched baseball.

15. The non-transitory computer-readable storage apparatus of claim 13, wherein the performance of the thresholding operation on the pixel-by-pixel basis for the second frame of the first plurality of frames is only performed on a subset of pixels of the second frame.

16. The non-transitory computer-readable storage apparatus of claim 13, wherein the determination of the location of the object of interest comprises determination that a pixel value for a pixel within the first frame is within a predetermined range of pixel values.

17. The non-transitory computer-readable storage apparatus of claim 13, wherein the segmentation of the object of interest out of the captured scene further comprises performance of a reposition operation for the object of interest within the segmented scene within each of the first plurality of frames.

18. The non-transitory computer-readable storage apparatus of claim 13, wherein the analysis of the segmented scene further comprises performance of a second thresholding operation on the segmented scene to identify the markers associated with the object of interest.

19. The non-transitory computer-readable storage apparatus of claim 18, wherein the performance of the second thresholding operation comprises determination of placement of a finger with respect to a geometric center of the pitched baseball.

20. The non-transitory computer-readable storage apparatus of claim 19, wherein the performance of the second thresholding operation further comprises determination of seam orientation with respect to the geometric center of the pitched baseball.

* * * * *